Patented Oct. 10, 1939

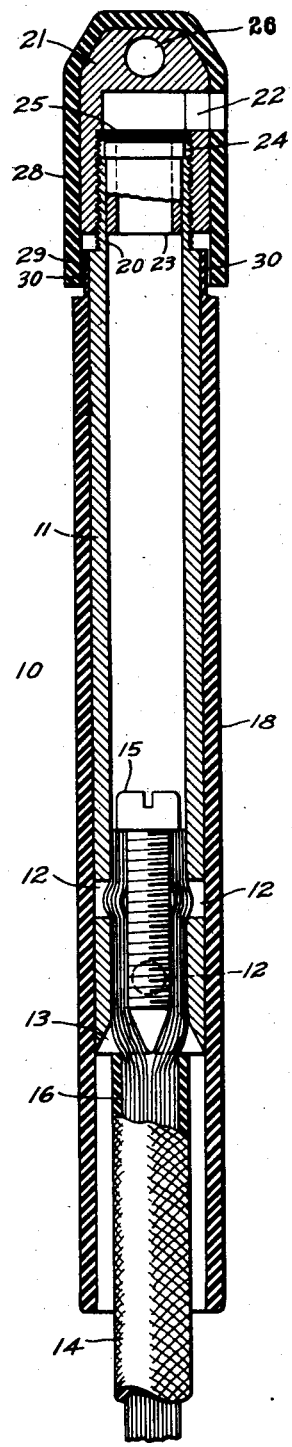

2,175,871

UNITED STATES PATENT OFFICE 2,175,871

ELECTRODE HOLDER

Cedric A. Bourne, Stafford, England, assignor to The English Electric Company, Limited, London, England, a British company Application February 20, 1937, Serial No. 126,848
In Great Britain June 30, 1936

6 Claims. (Cl. 219—8)

My invention refers, generally, to electric arc welding and it has reference in particular to an improved manual electrode holder for use in electric arc welding.

It has heretofore generally been the custom in electric arc welding to use manual electrode holders principally of the type having spring actuated jaw members for gripping the electrode. Such holders must of necessity have considerable exposed live metal parts, which when the holder is in use, are liable to come in contact with a grounded member, thereby not only becoming a hazard to the operator through the possibility of flashing of the operator's eyes, but possibly causing damage to the holder itself through the burning away of such parts as come in contact with the grounded member. Further, with the usual exposure of live metal parts there is always present the possibility of the operator himself being grounded and coming into contact with such exposed parts, thereby rendering himself liable to electric shock from such contact.

Still other disadvantages are present in the common type of electrode holder, for in order to make an electric holder of this type rugged, cast or forged jaw members are commonly used, which not only make the holder heavy and unwieldly to use, but also expensive to manufacture. Further, the projecting parts necessary in such a spring-actuated jaw type of electric holder for the manipulation of the jaw by the operator, tend to limit the clearance of such a holder when welding in corners or other inaccessible places.

It is, therefore, an object of my invention to provide a manual electrode holder of novel design which shall have no exposed live parts.

Another object of my invention shall be to provide a light-weight welding electrode holder of simple design which shall be easy to manipulate and economical to manufacture.

Still another object of my invention is to provide a compact insulated electrode holder having a positively locking electrode grip and simple effective means of securing a welding cable within the holder.

A further object of my invention shall be to provide an electrode holder of such construction that the electrode may be secured therein by relative rotation of the body and clamping members.

A still further object of my invention shall be to provide an electrode holder having a light-weight tubular body member and a rotatable clamping member thereon in which an electrode may be used as a turning lever to secure a clamping action on the electrode to be used.

My invention, accordingly, is disclosed in the embodiment hereof shown in the accompanying drawing, and comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying single figure, which shows a sectional side view of an electrode holder embodying my invention.

In a preferred form of my invention, the electrode holder 10 may comprise a tubular conducting body member 11 provided with a plurality of transverse openings or interior recesses 12 at one end which is chamfered at 13 to provide a bell-mouth entrance. A welding cable 14 may be secured in electrical contact to this end of the body member 11 in any desired manner, such as by a pointed screw member 15 forced axially into the exposed end of the cable 14, which is inserted in the chamfered end of the body member, thereby wedging the wire 16 of the cable into the transverse openings or recesses 12 in the body member 11.

An insulating sleeve 18 may be firmly secured about the conducting body member 11 in any well known manner, leaving a portion 20 of the body member 11 exposed at one end and projecting beyond the other end of the body member over the welding cable 14, to provide a non-conducting handle for the electrode holder 10. The exposed portion 20 of the body member 11 may be threaded to receive the metallic cap nut 21, which is adapted to receive the end of an electrode in a transverse opening 22.

Within the projecting threaded portion 20, a hardened wearing sleeve 23 may be positioned. A shoulder portion 24 of the hardened wearing sleeve is adapted to abut against the end of the projecting threaded portion 20 of the body member 11 to provide a wearing surface 25 against which an electrode may be wedged by inserting the end of the electrode in the transverse opening 22 of the cap nut 21, and using the electrode as a turning bar to tighten the cap nut 21, so forcing the electrode against the wearing surface 25.

A second transverse opening 26, shown in this instance as at right angles to the transverse electrode opening 22, provides means whereby the cap nut 21 may be rotated through the insertion of the end of an electrode in said second opening when the used end of a welding electrode is desired to be removed from the transverse opening 22.

An insulating cap 28 may be disposed about the cap nut 21 and have a projecting portion 29 which overlaps the end of the insulating sleeve 18, thereby completely insulating all metallic parts of the electrode holder 10 from possible contact with the operator or adjacent grounded members. By providing a reduced diameter portion 30 on the insulating sleeve 18 a smoother joint may be secured.

It may, therefore, be seen that my invention provides a manual electrode holder of novel and useful design that is of both light weight and durable construction. The parts are simple to make, inexpensive to machine and readily assembled. The resultant holder is not only safe to use, being completely insulated, but is also easy to manipulate, being well balanced, and, because of its compact construction, advantageous to use when welding in corners or other inaccessible places.

Since certain changes may be made in the above construction and different embodiments of the invention may be made without departing from the spirit thereof, it is intended that all matter contained in the foregoing description or shown in the accompanying drawing should be considered as illustrative, and not in a limiting sense.

I claim as my invention:

1. A manual electrode holder comprising, in combination, a tubular metallic body member, an insulating sleeve disposed about said body member, means within the body member for securing a welding cable to one end of the body member, a threaded portion at the other end of the body member, a metallic nut member disposed upon said threaded portion of said body member, said metallic nut member having a transverse opening in one side thereof adapted to engage a welding electrode when said nut member is advanced upon the threaded portion of the body member, and a through transverse opening wherein an additional electrode may be inserted for turning the said nut member for releasing a consumed electrode from the first mentioned opening.

2. In an electrode holder, in combination, a tubular metallic body member, an insulating sleeve disposed about the body member to provide a handle, means disposed within the body member to secure a welding cable within the central opening, a threaded portion on one end of the body member, a threaded metallic cap nut adapted to be positioned upon said threaded portion of the body member and provided with a transverse opening in one side wherein an electrode may be secured by rotation of said cap nut, and a one piece insulating cap provided with a similar transverse opening disposed about the cap nut and in overlapping relation with the insulating sleeve.

3. In an electrode holder, the combination of a tubular insulating handle, a tubular conducting member positioned within the insulating handle, means within the conducting member adapted to secure the end of a welding cable therein, a threaded portion of the conducting member projecting axially from the insulating handle, a transversely bored cap nut adapted to be positioned upon the threaded portion of the conducting member to secure an electrode in the transverse bore by using the electrode as a turning bar for the cap nut, said transverse bore penetrating one side only of the cap nut, and an insulating cap disposed about the exterior portions of the cap nut.

4. An electrode holder comprising a tubular insulating handle, a conducting sleeve disposed within the insulating handle and having a threaded portion extending from one end of the insulating handle, means disposed to engage and secure the end of a welding cable within the conducting sleeve, a transversely bored cap nut positioned upon the threaded portion of the conducting sleeve and adapted to secure an electrode in a transverse opening therein when the cap nut is advanced upon the threaded portion, and an insulating cap disposed about the cap nut in overlapping relation with the tubular insulating handle.

5. An electrode holder comprising, in combination, a conducting sleeve member having a threaded extension, means disposed within the sleeve member for securing a welding cable therein, a tubular insulating member disposed about the conducting sleeve with the threaded portion of the conducting sleeve projecting axially from the insulating utbe, a wear bushing positioned within the threaded end of the conducting sleeve, and an insulated cap nut disposed upon the threaded sleeve portion, said cap nut having a transverse opening in one side disposed to receive and secure an electrode by wedging the electrode against the wear bushing upon rotation of the cap nut and a second transverse bore wherein a second electrode may be inserted to turn the cap nut to release a portion of a used electrode.

6. An electrode holder comprising a longitudinal conducting sleeve member provided with a threaded portion at one end, and means within the sleeve member for securing a welding cable in engagement with the sleeve, a tubular insulating handle disposed in fixed relation about the conducting sleeve, a hardened wear bushing positioned within the threaded portion of the sleeve member, a cap nut disposed upon the threaded portion, said cap nut having a transverse opening therein adapted to receive an electrode which may be secured therein through wedging the electrode against the hardened wear insert by tightening the cap nut, and an insulating sleeve disposed about the cap nut in overlapping relation with the insulating handle cooperative therewith to completely envelop the conducting portions of the holder.

CEDRIC A. BOURNE.